United States Patent [19]

Blain et al.

[11] Patent Number: 5,169,409
[45] Date of Patent: Dec. 8, 1992

[54] POLYMER MODIFIED HYDROXYALKYLENE SUBSTITUTED POLYAMINES AS LUBRICANT AND FUEL ADDITIVES

[75] Inventors: David A. Blain, Mt. Laurel; Angeline B. Cardis, Florence, both of N.J.

[73] Assignee: Mobil Oil Corp., Fairfax, Va.

[21] Appl. No.: 528,528

[22] Filed: May 17, 1990

[51] Int. Cl.$^5$ ............... C10L 1/22; C10M 129/95; C10M 133/58

[52] U.S. Cl. ..................... 44/347; 44/386; 44/399; 252/51.5 A; 252/56 D; 548/546; 548/547; 560/185

[58] Field of Search ............ 44/347; 252/51.5 A

[56] References Cited

U.S. PATENT DOCUMENTS

| | | | |
|---|---|---|---|
| 3,210,283 | 10/1965 | Stuart et al. | 252/51.5 |
| 3,227,739 | 1/1966 | Versteeg | 260/462 |
| 3,367,943 | 2/1968 | Miller et al. | 260/326.3 |
| 3,373,111 | 3/1968 | Le Suer et al. | 252/51.5 |
| 3,456,013 | 7/1969 | Egan et al. | 260/584 |
| 3,507,790 | 4/1970 | Beerbower et al. | 252/32.7 |
| 3,527,804 | 9/1970 | Cyba | 260/563 |
| 4,447,348 | 5/1984 | Forsberg | 252/75 |
| 4,448,703 | 5/1984 | Forsberg | 252/75 |
| 4,621,141 | 11/1986 | Chibnik | 544/358 |
| 4,664,834 | 5/1987 | Forsberg | 252/77 |

*Primary Examiner*—Ellen McAvoy
*Attorney, Agent, or Firm*—Alexander J. McKillop; Charles J. Speciale; Dennis P. Santini

[57] ABSTRACT

Reaction products which provide antioxidant properties to lubricants and fuels while serving as effective dispersants and detergents in these mediums. These products, of the reaction of a hydroxyalkylene substituted polyamines and substituted succinic anhydrides, contain mixtures of esters, amides and imides. Furthermore, preferred embodiments of the reaction products have pendent alcohol groups which provide extra dispersancy and detergency over traditional dispersants which typically do not have alcohol groups.

25 Claims, No Drawings

POLYMER MODIFIED HYDROXYALKYLENE SUBSTITUTED POLYAMINES AS LUBRICANT AND FUEL ADDITIVES

BACKGROUND OF THE INVENTION

The present invention is directed to modified polyamines, and more particularly, to the products of reactions in which substituted succinic anhydrides are reacted with hydroxyalkylene substituted polyamines.

Detergents and dispersants containing modified polyamines are known in the art. It has also been known to react polyamines with alkyl succinic anhydrides. The reaction products of polyamines and alkyl succinic anhydrides, however, typically display the characteristics of pro-oxidants.

In light of the disadvantages caused by the oxidizing characteristics of known detergents and dispersants, e.g. oil degradation, anti-oxidant depletion, potential sludge formation, it would be beneficial to provide detergents and dispersants for lubricants and fuels which provide antioxidant properties. It would be further beneficial to provide products which give extra dispersancy and detergency over traditional compounds known in the art.

SUMMARY OF THE INVENTION

The present invention provides reaction products which, when used as additives, advantageously provide antioxidant properties to lubricants and fuels while serving as effective dispersants and detergents in these mediums. The reaction products of the present invention are obtained from the reaction of hydroxyalkylene substituted polyamines and substituted succinic anhydrides. The reaction products contain mixtures of esters, amides and imides. Furthermore, the reaction products will frequently have pendent alcohol groups which provide extra dispersancy and detergency over traditional dispersants which typically do not have alcohol groups.

DETAILED DESCRIPTION

The present invention comprises novel reaction products and the use of the reaction products as additives for lubricants and fuels which advantageously provide antioxidant properties to those materials while serving as an effective dispersant and detergent. In accordance with a first step of the present invention, long chain epoxides are reacted with polyamines to form a hydroxyalkylated polyamine. For example, a polyamine such as a poly(ethylene amine) may be reacted with a long chain epoxide in accordance with the general formula:

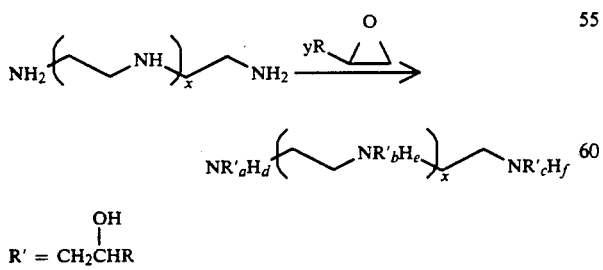

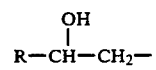

$R' = CH_2CHR$ where $R = C_4$ to about $C_{200}$ hydrocarbyl, $y = 1$ to $(x+4)$, $x = 0$ to $4$, $a+b+c=y$, $d+e+f=(x+4)-y$, $a+d=2$, $b+e=1$, and $c+f=2$.

The present invention is not limited to poly(ethylene amines) such as ethylene diamine, diethylene triamine, triethylene tetramine, tetraethylene pentamine, and pentethylene hexamine. Other polyamines such as poly(propylene amines) and other amines which contain at least two nitrogens, at least one of which is primary or secondary, may be used. Another suitable example is tris(2-amino ethyl) amine.

The reactants are heated to about 100° C. to about 250° C. and preferably to about 150° C. to about 200° C., in a reactor with an $N_2$ purge for about 1 to about 24 hrs., and preferably for about 3 hrs. to about 10 hrs., most preferably until all of the starting epoxide has reacted. During this reaction, the reactants are typically kept at ambient pressures but slightly higher or lower pressures can also be used. The product of this reaction is a hydroxyalkylene substituted polyamine having at least one of the following radical:

$$\begin{array}{c} \text{OH} \\ | \\ R-CH-CH_2- \end{array}$$

After optional cooling, the substituted polyamines are then reacted with substituted succinic anhydrides, for example polyisobutenyl succinic anhydrides (PBSA's). In the presence of an inert solvent such as toluene or xylene, these reactants are preferably heated to reflux, for example, to a temperature of about 100° C. to about 150° C., for about 3 hrs. to about 10 hrs., preferably until none of the starting succinic anhydride remains. During this reaction, the reactants are typically kept at ambient pressures but slightly higher or lower pressures can also be used. The ratio of PBSA to substituted polyamine can be from about 1:1 to about x+4:1. Depending on the various ratios used, the reaction products contain various combinations of esters, amides, and imides. Those skilled in the art will appreciate that many of the reaction products of the present invention will advantageously have pendent alcohol groups. If, however, for example, $y = x+4$ and the ratio of PBSAs to substituted polyamine is greater than $y/2$, then no alcohol groups will theoretically be present. The pendent alcohol groups are desirable in that they enhance the dispersancy and detergency of the lubricants and fuels to which the reaction products are added. Those skilled in the art will also appreciate that these reaction products may require the removal of solvents and/or filtration prior to their use as additives.

The products of this invention can be added to lubricants, for example, at about 0.1% to about 10% by weight and to fuels such as hydrocarbon fuels, oxygen-containing fuels or mixtures thereof, for example, at about 25 lbs. to about 500 lbs. of additive per 1000 barrels of fuel.

While the additives of the present invention can be obtained by the reaction of different compounds within the above-referenced classes of compounds, the following examples further illustrate the present invention.

EXAMPLE 1

56.7 gm (0.3 mol) of TEPA (tetraethylene pentamine) and 300 ml of xylenes were charged to a 2 liter reactor equipped with an $N_2$ inlet, mechanical stirrer, thermometer, and Dean Stark trap. The mixture was heated to reflux for 2 hrs. with an $N_2$ purge. Less than 0.5 ml water was collected. The reaction was allowed to cool to room temperature and then 338.4 gm (1.2 mol) 1,2- epoxyoctadecane was added. The reaction was heated to 175° C. by removing the xylenes through the Dean Stark trap. TLC after 3.5 hr. showed that all of the 1,2-epoxyoctadecane had reacted. The reaction was stripped under house vacuum (ca. 250-300 mmHg) at 150° C. until no more xylenes distilled. The resulting tan liquid solidified into a waxy solid upon cooling.

EXAMPLE 2

The procedure of Example 1 was followed with the following exception: the molar ratio of TEPA to 1,2-epoxyoctadecane utilized was 1:2.

EXAMPLE 3

The procedure of Example 1 was followed with the following exception: the molar ratio of TEPA to 1,2-epoxyoctadecane was changed to 1:3.

EXAMPLE 4

The procedure of Example 1 was followed with the following exception: the molar ratio of TEPA to 1,2-epoxyoctadecane was changed to 1:6.

EXAMPLE 5

65.8 gm (0.45 mol) of tris(2-aminoethyl)amine and 300 ml of xylenes were charged to a 2 liter reactor equipped with an $N_2$ inlet, mechanical stirrer, thermometer, and Dean Stark trap. The mixture was heated to reflux for 2 hr. with an $N_2$ purge. 0.2 ml of water was collected. The reaction was allowed to cool to room temperature and 380.7 gm (1.35 mol) 1,2-epoxyoctadecane was added. The reaction was heated to 175° C. by removing xylenes through the Dean Stark trap. TLC after 5 hrs. showed that all of the 1,2-epoxyoctadecane had reacted. The reaction was stripped under house vacuum (ca. 250-300 mmHg) at 150° C. until no more xylenes distilled. The resulting tan liquid solidified into a waxy solid upon cooling.

EXAMPLE 6

The procedure described in Example 5 was followed with the following exception: the molar ratio of tris(2-aminoethyl)amine to 1,2-epoxyoctadecane was changed to 1:2.

EXAMPLE 7

46.1 gm (0.035 mol) of the product from Example 1, 34.7 gm (0.035 mol) of a polyisobutenyl succinic anhydride made from maleic anhydride and 920 MW polyisobutylene, and 100 ml of toluene were charged to a 500 ml reactor equipped with an $N_2$ inlet, mechanical stirrer, thermometer, and Dean Stark trap. The mixture was heated to reflux for six hours during which time 0.15 ml water was collected and no IR peaks for the starting succinic anhydride remained. The reaction was stripped of solvent via rotary evaporation and filtered through celite. The caramel colored liquid solidified into a waxy solid upon cooling.

EXAMPLE 8

The procedure of Example 7 was followed with the following exception: the molar ratio of substituted polyamine to PBSA was changed to 1:2.

EXAMPLE 9

The procedure of Example 7 was followed with the following exception: the PBSA used was the reaction product of maleic anhydride and 460 MW polyisobutylene.

EXAMPLE 10

The procedure of Example 7 was followed with the following exception: the product from Example 2 was used instead of the product from Example 1.

EXAMPLE 11

The procedure of Example 8 was followed with the following exception: the product from Example 2 was used instead of the product from Example 1.

EXAMPLE 12

The procedure of Example 9 was followed with the following exception: the product from Example 2 was used instead of the product from Example 1.

EXAMPLE 13

The procedure of Example 7 was followed with the following exception: the product from Example 3 was used instead of the product from Example 1.

EXAMPLE 14

The procedure of Example 9 was followed with the following exception: the product from Example 4 was used instead of the product from Example 1.

EXAMPLE 15

The procedure of Example 7 was followed with the following exception: the product from Example 5 was used instead of the product from Example 1.

EXAMPLE 16

The procedure of Example 8 was followed with the following exception: the product from Example 5 was used instead of the product from Example 1.

EXAMPLE 17

The procedure of Example 7 was followed with the following exception: the product from Example 6 was used instead of the product from Example 1.

EXAMPLE 18

The procedure of Example 8 was followed with the following exception: the product from Example 6 was used instead of the product from Example 1.

EXAMPLE 19

103.2 gm (1.0 mol) of diethylene triamine was charged to a 500 ml reactor equipped with an $N_2$ inlet, thermometer, mechanical stirrer, and addition funnel charged with 382.1 gm (5.3 mol) of butylene oxide. The reaction was heated to 110° C. and the butylene oxide was added dropwise over 2 hours. External heating was discontinued and a cooling bath was added about half way through the addition to control the exotherm. The reaction was heated at 110° C. for an additional hour after the addition was complete. It was then stripped via rotary evaporation and was filtered through a bed of celite. The resulting product was clear, orange, viscous liquid.

EXAMPLE 20

The procedure of Example 7 was followed with the following exception: the product from Example 19 was substituted for the product from Example 1.

Oxidation Evaluation

The following examples show the surprising antioxidant capabilities of these additives at a 1% level in a neutral base stock.

| Additive | B-10 Catalytic Oxidation Test 325° F., 40 Hours | |
|---|---|---|
| | ΔNN | % ΔKV |
| None | 12.1 | 141.5 |
| Example 7 | 1.0 | 2.2 |

The samples were tested using Mobil's B10 procedure as described in U.S. Pat. No. 4,715,974.

In order to confirm the advantages of the present invention and the importance of the order of reactions, a sample from U.S. Pat. No. 3,373,111 was synthesized and compared to one of the examples described above. The samples were tested at a level of 4% by weight in a formulated marine lubricant minus its usual ashless dispersant. The fully formulated oil is also included in the table below. The samples were tested using Mobil's B10 procedure as described in U.S. Pat. No. 4,715,974.

| | % ΔKV | ΔNN |
|---|---|---|
| Ex. 4 from 3,373,111 | 53 | 7.0 |
| Ex. 7 | 46 | 4.3 |
| Marine Lubricant | 80 | 7.6 |

This comparison indicates that the present invention provides both better control of acid number and kinematic viscosity than the sample from U.S. Pat. No. 3,373,111.

What is claimed is:

1. A mixture of esters, amides and imides comprising the reaction products of:
   a first reactant comprising about 0.5 to x+4 molar equivalents of a member of the group consisting of alkyl succinic anhydride and alkenyl succinic anhydride; and
   a second reactant having the formula:

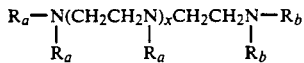

where

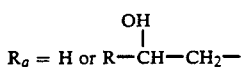

$R_a$ = H or R—CH—CH$_2$— with OH on the CH except that at least one $R_a$ does not represent H, and

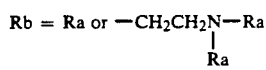

Rb = Ra or —CH$_2$CH$_2$N—Ra with Ra below

R = a branched or linear, saturated or unsaturated hydrocarbyl having about 4–200 carbon atoms,
   x = 0 to 4.

2. A mixture according to claim 1 wherein said second reactant is the product of the reaction of:
   an epoxide having the general formula

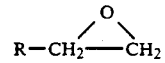

where R = $C_4$–$C_{200}$; and at least one polyamine.

3. A mixture according to claim 2 wherein said polyamine comprises a poly(ethylene amine).

4. A mixture according to claim 2 wherein said polyamine comprises a poly(propylene amine).

5. A mixture according to claim 2 wherein said polyamine comprises a tetraethylene pentamine.

6. A mixture according to claim 2 wherein said first reactant comprises a polyisobutenyl succinic anhydride.

7. A mixture according to claim 2 wherein said polyamine comprises a tris(2-amino ethyl) amine.

8. A mixture according to claim 1 wherein said first reactant comprises alkenyl succinic anhydride.

9. A mixture according to claim 1 wherein said first reactant comprises a polyisobutenyl succinic anhydride.

10. A mixture according to claim 1 wherein the ratio of said first reactant to said second reactant is about 1:1 to about x+4:1.

11. A method for improving the anti-oxidant properties of fuels and lubricants comprising incorporating into said fuels and lubricants the reaction products of:
    a first reactant comprising a member of the group consisting of alkyl succinic anhydride and alkenyl succinic anhydride; and
    a second reactant having the formula:

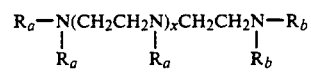

where

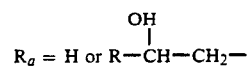

$R_a$ = H or R—CH—CH$_2$— with OH except that at least one $R_a$ does not represent H, and

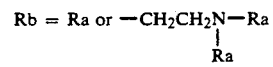

Rb = Ra or —CH$_2$CH$_2$N—Ra

R = a branched or linear, saturated or unsaturated hydrocarbyl having about 4–200 carbon atoms,
    x = 0 to 4.

12. A method according to claim 11 wherein said second reactant is the product of the reaction of:
    an epoxide having the general formula

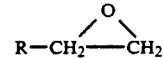

where R = about $C_4$–$C_{200}$; and at least one polyamine.

13. A method according to claim 12 wherein said polyamine comprises a poly(ethylene amine).

14. A method according to claim 12 wherein said polyamine comprises a poly(propylene amine).

15. A method according to claim 12 wherein said polyamine comprises a tetraethylene pentamine.

16. A mixture according to claim 12 wherein said polyamine comprises a tris(2-amino ethyl) amine.

17. A method according to claim 11 wherein said first reactant comprises a polyisobutenyl succinic anhydride.

18. A method according to claim 11 wherein said first reactant comprises a polyisobutenyl succinic anhydride.

19. A method according to claim 11 wherein the ratio of said first reactant to said second reactant is about 1:1 to about x+4:1.

20. A mixture according to claim 12 wherein said first reactant comprises alkenyl succinic anhydride.

21. A fuel comprising about 25 lbs. to about 500 lbs. per 1000 barrels of fuel of a mixture of esters, amides and imides comprising the reaction products of:

a first reactant comprising about 0.5 to x+4 molar equivalents of a member of the group consisting of alkyl succinic anhydride and alkenyl succinic anhydride; and a second reactant having the formula:

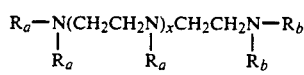

where

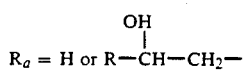

except that at least one $R_a$ does not represent H, and

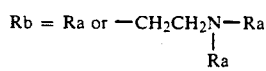

R = a branched or linear, saturated or unsaturated hydrocarbyl having about 4-200 carbon atoms
x = 0 to 4.

22. A fuel according to claim 21 wherein said fuel comprises a hydrocarbon fuel.

23. A fuel according to claim 21 wherein said fuel comprises an oxygen containing fuel.

24. A fuel according to claim 21 wherein said fuel comprises a mixture of hydrocarbon fuel and oxygen containing fuel.

25. A lubricant comprising about 0.1% to about 10% by weight of a mixture of esters, amides and imides comprising the reaction products of:

a first reactant comprising about 0.5 to x+4 molar equivalents of a member of the group consisting of alkyl succinic anhydride and alkenyl succinic anhydride; and a second reactant having the formula:

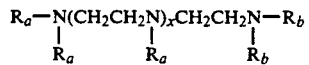

where

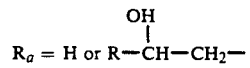

except that at least one $R_a$ does not represent H, and

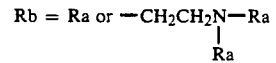

R = a branched or linear, saturated or unsaturated hydrocarbyl having about 4-200 carbon atoms,
x = 0 to 4.

* * * * *